Feb. 16, 1971  E. O. BUTTS  3,564,526
PIPELINE LEAK DETECTION DEVICE
Filed Nov. 16, 1967

United States Patent Office

3,564,526
Patented Feb. 16, 1971

3,564,526
PIPELINE LEAK DETECTION DEVICE
Ernest O. Butts, 1002 Alpine Ave.,
Ottawa 14, Ontario, Canada
Filed Nov. 16, 1967, Ser. No. 683,553
Claims priority, application Canada, Dec. 23, 1966,
978,842
Int. Cl. G08b 21/00
U.S. Cl. 340—242          4 Claims

ABSTRACT OF THE DISCLOSURE

A device for use in detecting leaks in a buried pipeline comprising a pair of conductors positioned beneath said pipe and spaced apart by an insulation which is degradable by the fluid contained within said pipe and substantially impervious to ground water or other liquids which may contact the insulation during use.

---

The present invention relates to apparatus for detecting leaks in pipelines carrying fuel oils, crude oils or other hydro-carbons in liquid or gaseous form.

Numerous attempts have been made in the past to develop apparatus for detecting leaks in pipelines and many devices have been patented for this purpose. All of these devices however, have suffered from limitations of one sort or another which have prevented the successful detection of pipeline leaks.

One prior device for detecting leaks in pipelines is shown in U.S. Patent 3,060,315 to Scherbatskoy. This patent teaches the use of an exploring instrument inside the pipeline to detect the accumulation of leakage outside the pipe by an n-gamma reaction. The exploring instrument contains a neutron source together with a gamma detector and is passed internally of the pipe to locate leaks. It will be appreciated that such a device is of limited usefulness since it may only be inserted in pipes of a sufficient diameter to carry the exploring instrument and will only detect leaks where an adequate flux of gamma rays reaches the detector.

United States Pat. No. 3,025,606 shows another device developed for detecting pipeline leaks. This device is limited to use between two manholes in an underground conduit system and would not be suitable for direct burial with a pipeline. Other devices such as shown in U.S. Pat. No. 3,170,152 have been developed but have not been satisfactory.

The present invention provides a leak detection system with a leak detector which may be buried directly with the pipeline and which can be used with branched or distributor type systems and will accurately detect leaks and pinpoint their location so that appropriate repairs can be effected. The present invention is particularly suited for buried pipes which are used in distribution systems for domestic grades of fuel oil throughout residential subdivisions.

The basic concept of the invention consists in positioning a pair of insulated conductors adjacent the buried pipe, the action of a fluid leaking from the pipe serving to destroy the insulation between the conductors, causing a short circuit and permitting a flow of current from one conductor to the other.

In accordance with one embodiment of the invention, a first copper wire insulated with a butyl rubber compound and spirally wrapped with a second bare copper wire, is buried together with and immediately beneath a pipeline to be protected, and the action of the fluid leaking from the pipeline serves to degrade or perish the insulation causing a short. The first and second wires are connected to a suitable source of high voltage, and when the short occurs, a current flows between the insulated conductor and the outer wrapping.

This flow of current operates an alarm to indicate the presence of a leak. Preferably the source of high voltage is a high resistance or high leakage reactance type of supply so that the current drawn by a short circuit will be limited. The insulated wire with its bare wire wrapping is preferably laid immediately beneath the pipeline and fastened to the pipe by any suitable means, such as an adhesive tape so that any leakage which occurs will immediately contact the insulation causing the desired breakdown. Once the breakdown has occurred then the location of the break is readily pinpointed using known types of equipment, such as conventional telephone cable fault measuring equipment. In accordance with a further aspect of the invention it is contemplated that the alarm system connected to the leak detector of the present invention would be maintained in a central location such as at a telephone exchange where full fault locating facilities are available. Thus a pipeline leak would immediately be detected and the location of the leak could be determined with a minimum of delay.

It is desirable that breakdown in the insulation between the two conductors should be a permanent low resistance short which would assist in detecting the location of such breakdowns. The fact that a short length of electrical cable requires replacement when a leak is repaired is inconsequential compared with the benefit obtained from being able to detect and accurately pinpoint leaks at an early stage before substantial leakage and damage occurs.

In accordance with the present invention a device for detecting leaks in buried pipelines comprises a pair of conductors positioned beneath said pipe and spaced apart by an insulation which is degradable by the fluid contained within said pipe and substantially impervious to ground water or other liquids which may contact the insulation during use.

In drawings which illustrate the construction and use of devices in accordance with the present invention, FIG. 1 is a schematic view of a portion of a buried pipeline fitted with a detector constructed in accordance with the present invention.

Figure 1:
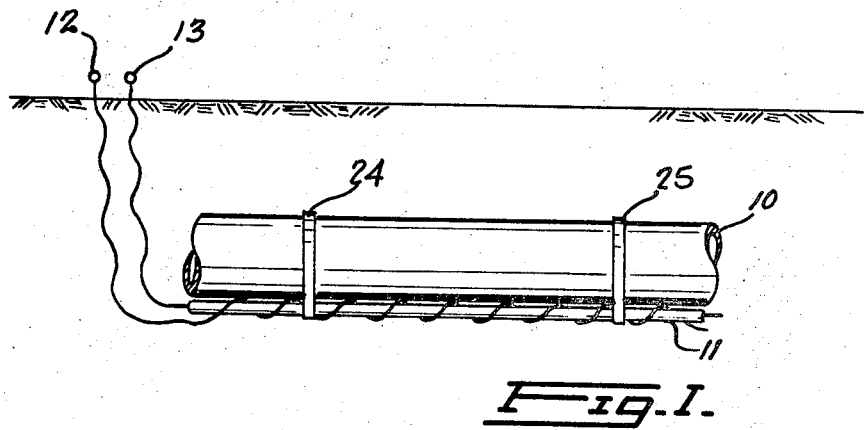

Referring to FIG. 1 there is shown a pipeline 10 beneath which a detector wire constructed in accordance with the invention 11 is positioned. The device 11 is illustrated in FIG. 1 as fastened to the pipe 10 by suitable fastenings 24 and 25 which may for example be wrappings of an adhesive tape, metal bands or any suitable means. The wrappings 24 and 25 serve mainly to hold the device 11 in place beneath the pipe while the pipe is being buried so that any leakage which occurs will immediately affect the insulation of the device 11. As illustrated in FIG. 1, a pair of terminals 12 and 13 are provided which are connected to each side of the electric circuit of the device 11 for energizing the device during operation.

Figure 2:
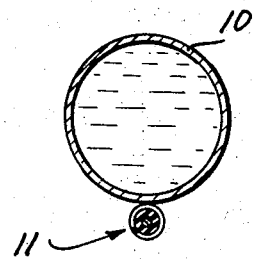
FIG. 2 is a cross section of the pipeline shown in FIG. 1.

FIG. 2 is a cross section of the pipe 10 of FIG. 1 showing the device 11 positioned immediately beneath the pipe 10 in intimate contact therewith so that the smallest leak will reach the device 11 and cause its operation as explained hereinafter.

Figure 3:
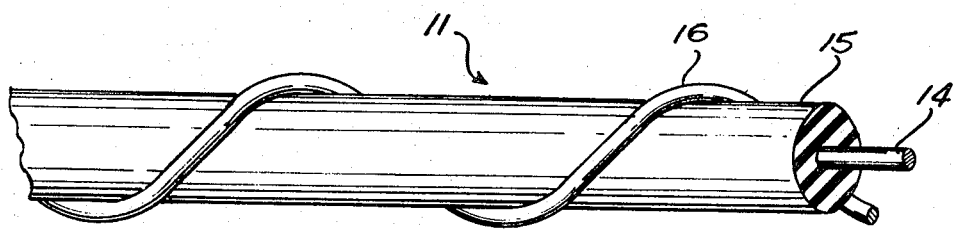
FIG. 3 is a perspective view of one form of detection device suitable for use in accordance with the present invention.

FIG. 3 illustrates the structure of one embodiment of the device 11 which consists of a central copper conductor 14 surrounded with a butyl rubber insulation 15.

On the outside of the insulation 15 a second copper conductor 16 is wrapped in a spiral.

Preferably the spiral conductor 16 is tensioned at the time that it is wrapped about the conductor 14 and insulation 15, so that the degradation of the insulation 15 will permit the conductor 16 to work its way into the insulation 15 and thus reduce the spacing between the conductors 14 and 16, thereby accelerating the action of the device 11.

It will be appreciated that the device 11 may take alternative forms such as for example a pair of parallel conductors which are surrounded by a suitable insulation. In this regard it will be appreciated that butyl rubber is only one of a number of suitable insulations which may be used in accordance with the present invention. Such insulations may also comprise plastic and asphaltic compositions, the sole criterion being that the insulation is sufficiently degraded to permit a short circuit to occur between the two wires and cause a sufficient flow of current to energize the alarm. With the use of butyl rubber for example, it has been found that fuel oil destroys the insulation very quickly permitting contact to be made between the wires permitting the passage of an alarm current.

Figure 4:
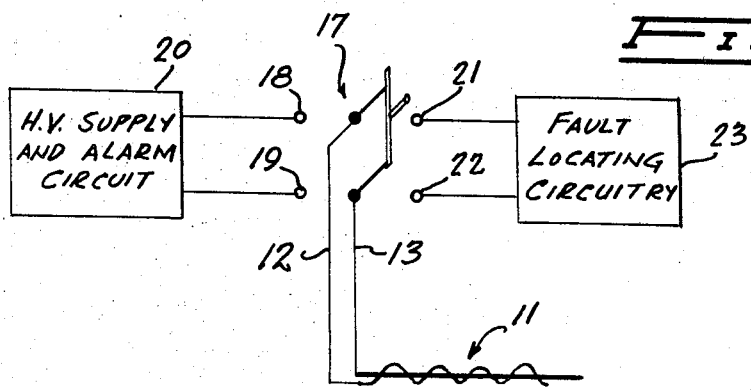
FIG. 4 is an electrical schematic diagram of the connection and operation of the detection device of the present invention.

FIG. 4 schematically illustrates the connection of the device 11 by means of a double-pole, double-throw switch 17 to the terminals 18 and 19 of a high voltage supply and alarm circuit 20, or alternatively to the terminals 21 and 22 of fault locating circuitry 23. It will be appreciated that the device 11 may either be connected to the high voltage supply 20 at all times, or alternatively it may be intermittently connected to the supply 20 for a test period sufficient to determine whether or not a leak has occurred in the pipeline.

It will be appreciated that numerous changes may be made within the scope and spirit of the present invention, which is defined by the appended claims.

I claim:

1. A device for use in detecting leaks in a buried oil pipeline comprising a first copper conductor, butyl rubber insulation surrounding said first conductor, a tentioned second copper conductor spirally wrapped around said insulation, said first and second conductors being for connection to a source of high voltage, whereby destruction of said butyl rubber by said oil causes a short circuit between said first and second conductors to indicate a leak from said pipe.

2. In a system for detecting leaks in an oil pipeline buried in the ground including a source of voltage having a pair of terminals and fault measuring equipment for detecting and locating short circuits, the improvement comprising in combination a pair of electrical conductors connected to said terminals and separated by butyl rubber electrical insulation degradable by the oil in said pipeline, said conductors being urged toward each other and thereby compressing said insulation therebetween, said conductors and said insulation being positioned beneath said pipeline to expose said insulation to fluid leaking from said pipeline to cause a short circuit between said conductors on leakage of oil from said pipeline.

3. A method of locating leaks of oil from a buried pipeline by a leak detection device of the type having first and second copper conductors separated by butyl rubber insulation subject to destruction by said oil, comprising:
  positioning said leak detection device beneath said pipeline during construction,
  connecting said first and second conductors to a source of high voltage of the type having a high resistance or high leakage reactance to cause the current in said conductors to be limited when said insulation is destroyed by leakage to cause a short circuit between said conductors,
  actuating an alarm circuit by said short circuit current,
  disconnecting said leak detection device from said high voltage source on actuation of said alarm, and
  connecting said first and second short circuited conductors to electrical fault locating apparatus for determining the location of said short circuit thereby to locate said pipeline leak.

4. Apparatus for locating leaks of oil from a buried pipeline comprising a leak detection device having first and second copper conductors separated by butyl rubber insulation subject to destruction by said oil positioned beneath said pipeline during construction,
  a source of high voltage of the type having a high resistance or high leakage reactance, said first and second conductors being connected to said source of high voltage to cause a current to flow in said first and second conductors when said insulation is destroyed by leakage, the current in said conductors being limited when a short circuit occurs between said conductors,
  an alarm circuit actuated by said short circuit current, and electrical fault locating apparatus for determining the location of said short circuit thereby to locate said pipeline leak.

References Cited

UNITED STATES PATENTS

| | | | |
|---|---|---|---|
| 1,648,197 | 11/1927 | Roodhouse | 200—61.05 |
| 2,432,367 | 12/1947 | Andresen | 200—61.04 |
| 2,759,175 | 8/1956 | Spalding | 340—242 |
| 3,382,493 | 5/1968 | Loper, Jr., et al. | 340—242 |
| 3,427,414 | 2/1969 | Sheldahl | 200—61.08 |

FOREIGN PATENTS

| | | | |
|---|---|---|---|
| 1,092,693 | 11/1960 | Germany | 174—11 |
| 707,353 | 6/1941 | Germany | 340—242 |

THOMAS B. HABECKER, Primary Examiner

D. MYER, Assistant Examiner

U.S. Cl. X.R.

200—61.04, 61.08